United States Patent
Hayashi et al.

(10) Patent No.: US 7,862,099 B2
(45) Date of Patent: Jan. 4, 2011

(54) ROOF OPENING/CLOSING APPARATUS

(75) Inventors: Kenichiro Hayashi, Okazaki (JP);
Ryuta Fukada, Kariya (JP); Kastura Inoue, Chiryu (JP)

(73) Assignee: Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 154 days.

(21) Appl. No.: 12/292,746

(22) Filed: Nov. 25, 2008

(65) Prior Publication Data

US 2009/0140540 A1 Jun. 4, 2009

(30) Foreign Application Priority Data

Nov. 30, 2007 (JP) ............... 2007-310260

(51) Int. Cl.
*B60J 7/08* (2006.01)

(52) U.S. Cl. .................................. 296/107.08

(58) Field of Classification Search ............ 296/107.08, 296/24.44, 136.04, 136.05, 108, 37.16
See application file for complete search history.

(56) References Cited

U.S. PATENT DOCUMENTS

| | | | | |
|---|---|---|---|---|
| 4,687,247 A * | 8/1987 | Muscat | ............ | 296/136.06 |
| 4,799,729 A * | 1/1989 | Muscat | ............ | 296/136.06 |
| 5,921,608 A * | 7/1999 | Schmitt et al. | ......... | 296/107.08 |
| 6,010,178 A | 1/2000 | Hahn et al. | | |
| 6,254,165 B1 * | 7/2001 | Neubrand | ............ | 296/76 |
| 6,364,396 B1 | 4/2002 | Hayashi | | |
| 6,454,343 B1 * | 9/2002 | Wagner et al. | ......... | 296/107.08 |
| 6,604,774 B2 * | 8/2003 | Koch et al. | ............ | 296/107.08 |
| 6,616,213 B2 * | 9/2003 | Koch | ............ | 296/107.08 |
| 7,032,947 B2 * | 4/2006 | Queveau et al. | ......... | 296/24.44 |
| 7,322,635 B2 * | 1/2008 | Kuttner et al. | ......... | 296/107.08 |
| 7,367,607 B2 * | 5/2008 | Roeder et al. | ......... | 296/107.08 |
| 7,392,873 B2 * | 7/2008 | Habacker | ............ | 180/69.2 |
| 7,419,200 B2 * | 9/2008 | Queveau et al. | ......... | 296/24.44 |
| 7,497,500 B2 * | 3/2009 | Roeder et al. | ......... | 296/136.05 |
| 7,690,717 B2 * | 4/2010 | Baumeier | ............ | 296/136.06 |

(Continued)

FOREIGN PATENT DOCUMENTS

DE        44 46 483        6/1996

(Continued)

OTHER PUBLICATIONS

European Search Report dated Nov. 5, 2009.

*Primary Examiner*—H Gutman
(74) *Attorney, Agent, or Firm*—Finnegan, Henderson, Farabow, Garrett & Dunner, LLP

(57) ABSTRACT

A roof opening/closing apparatus for operating a roof of a vehicle to move between first and second positions includes a panel member for covering an upper portion of an accommodating space and a panel moving mechanism. The panel member includes a first panel and a second panel which are aligned in a longitudinal direction of the vehicle. The panel moving mechanism is provided under the panel member to movably support the first and second panels. The panel moving mechanism includes a sliding mechanism slidably moving the second panel relative to the first panel so that the first and second panels are overlapped when the roof is located in the first position and a length of the panel member in a longitudinal direction of the vehicle is reduced to be smaller than the length of the panel member when the roof is located in the second position.

4 Claims, 7 Drawing Sheets

U.S. PATENT DOCUMENTS

| | | | |
|---|---|---|---|
| 7,699,371 B2 * | 4/2010 | Van Berkum | 296/24.44 |
| 2001/0004156 A1 * | 6/2001 | Neubrand et al. | 296/76 |
| 2002/0149227 A1 * | 10/2002 | Wagner et al. | 296/107.08 |
| 2003/0020298 A1 * | 1/2003 | Koch | 296/107.08 |
| 2005/0067855 A1 * | 3/2005 | Guillez et al. | 296/107.08 |
| 2005/0077750 A1 * | 4/2005 | Queveau et al. | 296/107.08 |
| 2005/0077751 A1 * | 4/2005 | Guillez et al. | 296/107.08 |
| 2007/0182200 A1 * | 8/2007 | Baumeier et al. | 296/107.08 |

FOREIGN PATENT DOCUMENTS

| | | |
|---|---|---|
| DE | 100 51 615 | 5/2001 |
| DE | 10 2005 047 297 | 2/2007 |

* cited by examiner

F I G. 1
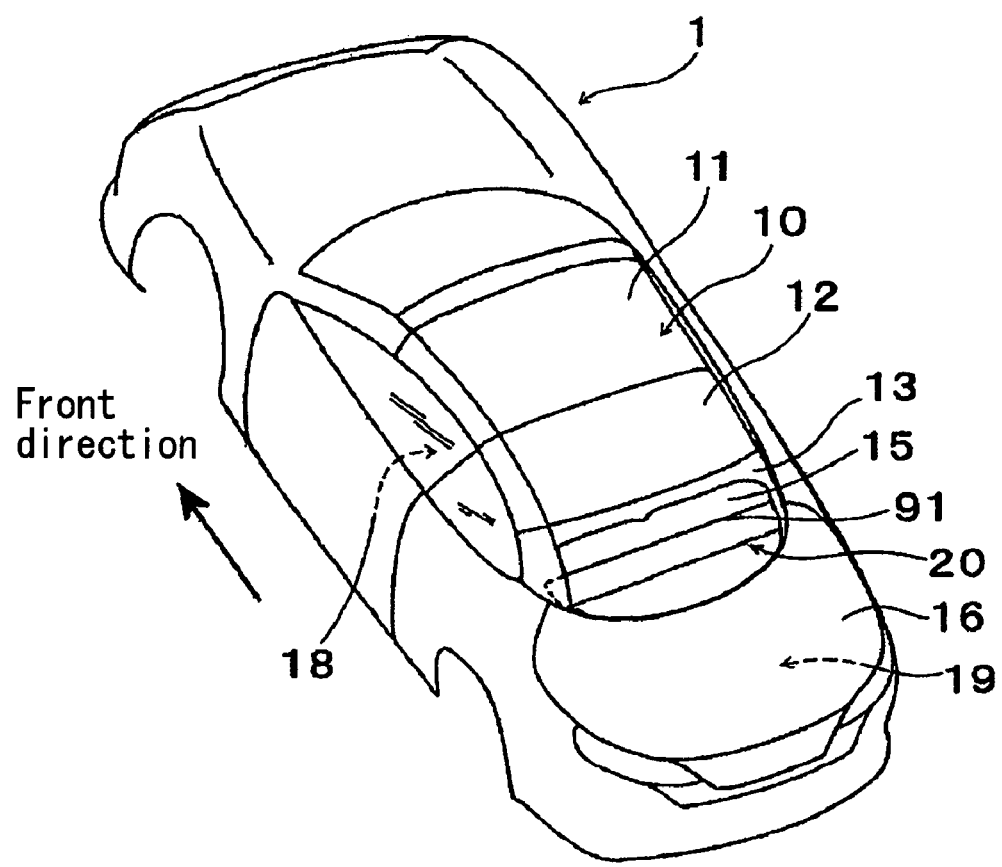

ROOF OPENING/CLOSING APPARATUS

CROSS REFERENCE TO RELATED APPLICATIONS

This application is based on and claims priority under 35 U.S.C. §119 to Japanese Patent Application 2007-310260, filed on Nov. 30, 2007, the entire content of which is incorporated herein by reference.

FIELD OF THE INVENTION

This invention generally relates to a roof opening/closing apparatus.

BACKGROUND

There exists a vehicle, such as a convertible automobile, which is used in an open-air mode and an enclosed mode by moving a roof of the vehicle between an extended position, at which a vehicle compartment is covered with the roof, and an accommodated position, at which the roof is retracted to be accommodated in an accommodating space (a trunk room) provided at a rear portion of the vehicle.

In such a vehicle, when the vehicle is used in the enclosed mode in which the roof is in the extended position, a panel member is approximately horizontally provided between a back seat of the vehicle and a back portion of the roof. Thus, a part of the trunk room inside the vehicle compartment is covered with the panel, on which small items, such as a hat of an occupant of the vehicle, are placed.

On the other hand, when using the vehicle in the open-air mode in which the roof is moved to the accommodated position, the roof, which is positioned between a front end of a cover of the trunk located outside of the vehicle compartment and a rear end of the panel member, is moved. Therefore, a space is generated at an upper portion of the trunk. Accordingly, such vehicle includes a roof opening/closing apparatus, which moves the panel member to cover the space generated at the upper portion of the trunk thereby closing the trunk.

The panel member according to a known roof opening/closing apparatus, which is for example disclosed in JP3013160B2 (hereinafter, referred to as reference 1), includes a front panel and a rear panel. When moving the roof from the extended position to the accommodated position, the front panel is downwardly pivoted (rotated) and moved in a downward direction to be accommodated in the trunk. Then, a part of the upper portion of the trunk located inside the vehicle compartment is closed (covered) with the rear panel, which is arranged horizontally, between the backseat and the back portion of the roof. On the other hand, when the roof is in the accommodated position, the front panel and the rear panel are horizontally aligned in a longitudinal direction of the vehicle so that a longitudinal width of the panel member becomes wide. Thus, a space generated when the roof is retracted is covered with the panel member, and the trunk is closed therewith.

However, according to the roof opening/closing apparatus disclosed in the reference 1, the front panel is downwardly moved to the trunk serving as the accommodating space when the roof is in the extended position. Therefore, a panel moving mechanism for supporting the panel member and moving the same may not be provided under the panel member. Accordingly, the panel moving mechanism is positioned at both lateral sides of the panel member extending in a width direction of the vehicle, thus supporting the panel member. In addition, the panel member is required to have a sufficient strength for placing the small items thereon and rigidity for restraining noise generation even when the vehicle causes vibrations. Therefore, a weight of the panel member supported only by the lateral ends thereof is increased.

A need thus exists for a roof opening/closing apparatus, which is not susceptible to the drawback mentioned above.

SUMMARY OF THE INVENTION

According to an aspect of the present invention, a roof opening/closing apparatus for operating a roof of a vehicle to move between a first position, at which the roof is extended to cover a compartment of the vehicle, and a second position, at which the roof is accommodated in an accommodating space, includes a panel member and a panel moving mechanism. The panel member is employed for covering an upper portion of the accommodating space. The panel member includes a first panel and a second panel, which are aligned in a longitudinal direction of the vehicle. The second panel is provided at a rear side of the first panel. The panel moving mechanism is provided under the panel member and movably supports the first panel and the second panel. The panel moving mechanism includes a sliding mechanism slidably moving the second panel relative to the first panel so that the first and second panels are overlapped when the roof is located in the first position and a length of the panel member in the longitudinal direction of the vehicle is reduced to be smaller than the length of the panel member when the roof is located in the second position.

BRIEF DESCRIPTION OF THE DRAWINGS

The foregoing and additional features and characteristics of the present invention will become more apparent from the following detailed description considered with reference to the accompanying drawings, wherein:

FIG. 1 is a perspective view illustrating a vehicle including a roof opening/closing apparatus seen from an upper rear side of the vehicle, according to an embodiment;

DETAILED DESCRIPTION

An embodiment of the present invention will be described hereinafter with reference to the attached drawings.

Figure 2A:
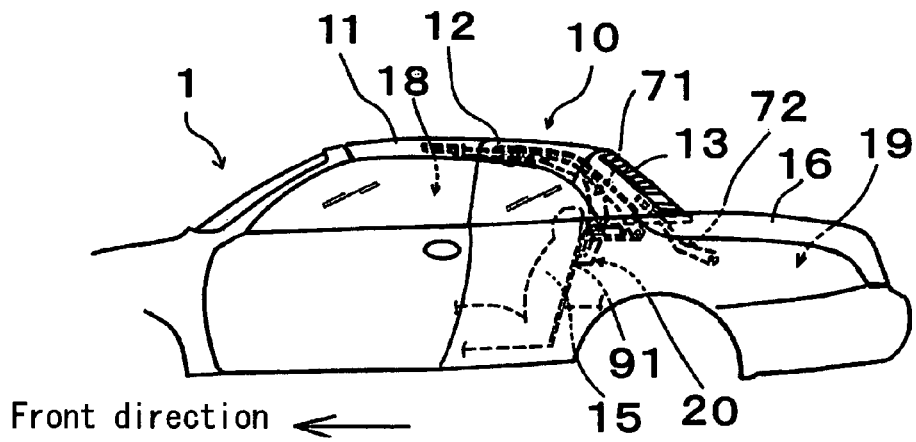
FIG. 2A is a side view illustrating the vehicle including the roof opening/closing apparatus when a roof is in an extended position.
Figure 2B:
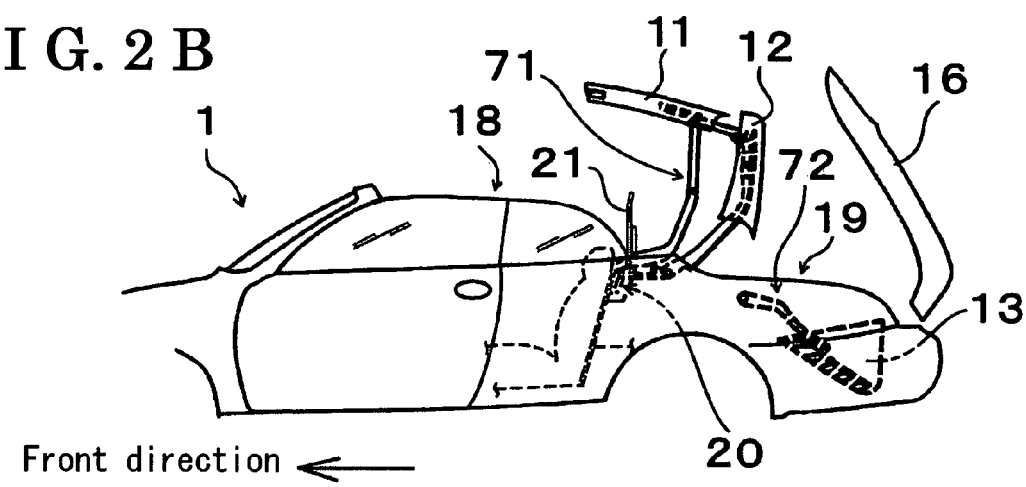
FIG. 2B is a side view illustrating the vehicle including the roof opening/closing apparatus when a roof is located between the extended position and an accommodated position.
Figure 2C:
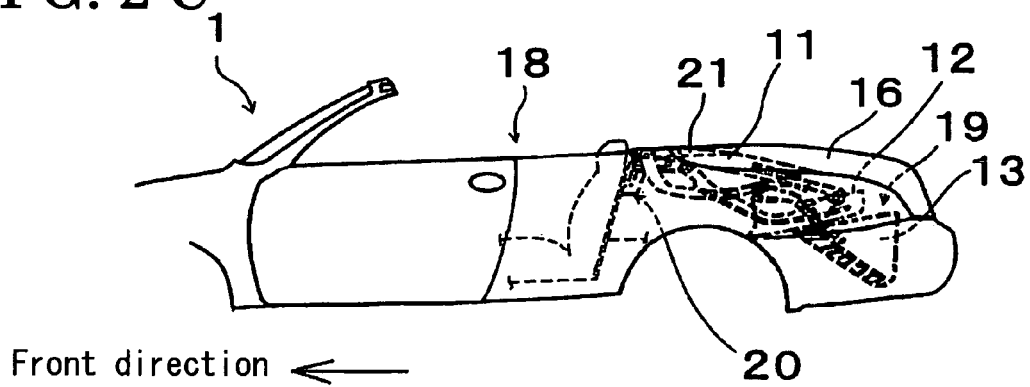
FIG. 2C is a side view illustrating the vehicle including the roof opening/closing apparatus when a roof is in the accommodated position.
Figure 3:
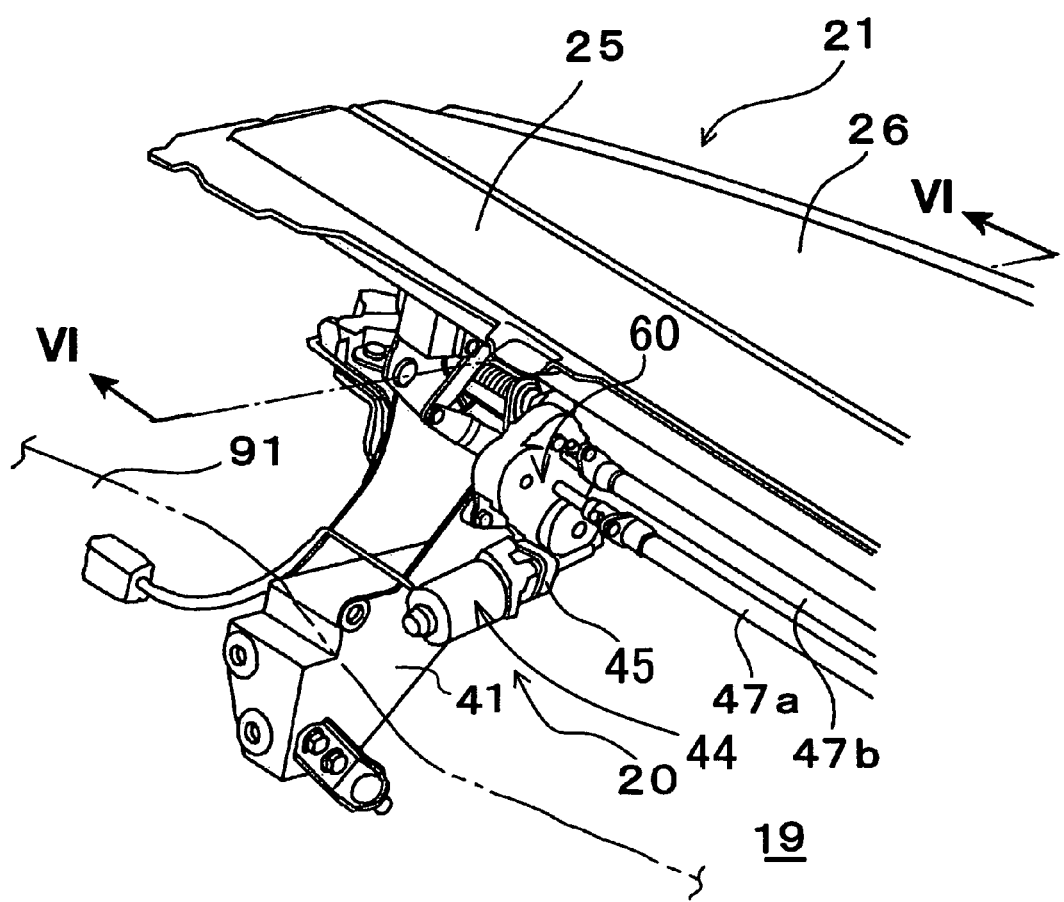
FIG. 3 is a perspective view illustrating the roof opening/closing apparatus, according to the embodiment.

As illustrated in FIGS. 1 to 3, a vehicle 1 is a so-called convertible automobile. As illustrated in FIG. 1, when a roof 10 is located in an extended position (serving as a first position) at which the roof 10 is extended to cover a vehicle compartment 18, the vehicle 1 is used in an enclosed mode.

The roof 10 of the vehicle 1 is structured with a front roof 11, an intermediate roof 12 and a rear roof 13, which are longitudinally arranged from a front side to a rear side of the vehicle 1 in series when the roof 10 is located at the extended position. A space provided at a rear portion of the vehicle 1 is employed as an accommodating space 19, which is normally used as a trunk. When the roof 10 is moved to an accommodated position (serving as a second position) at which the roof 10 is moved to be accommodated in the accommodating space 19, the vehicle 1 is used in an open-air mode.

As illustrated in FIG. 1, a roof opening/closing apparatus 20 is assembled at the vehicle 1 at a position between a vehicle body portion 91 and the rear roof 13. The vehicle body portion 91 supports a seatback portion 15 of a seat (back seat) of the vehicle 1. The roof opening/closing apparatus 20 is employed for operating the roof 10 to move between the extended position and the accommodated position. Further, the roof opening/closing apparatus 20 includes a plane panel member 21, which is substantially horizontally arranged when the roof 10 is located in the extended position.

A process of retracting the roof 10 from the extended position to the accommodated position is illustrated in FIGS. 2A, 2B and 2C in sequential order. The front roof 11 and the intermediate roof 12 are supported by a first supporting mechanism 71. The rear roof 13 of the roof 10 is supported by a second supporting mechanism 72. When retracting the roof 10 to be accommodated in the accommodating space 19, first, a cover 16 of the accommodating space 19 is opened by an operation of a trunk opening/closing apparatus, and the rear roof 13 is retracted in the accommodating space 19 by an operation of the second supporting mechanism 72. Then, the front roof 11 and the intermediate roof 12 are folded by the first supporting mechanism 71 and retracted to be accommodated in the accommodating space 19.

When the roof 10 is moved between the extended position towards the accommodated position as illustrated in FIG. 2B, the panel member 21 being in a horizontal position when the roof 10 is located in the extended position is moved to an upright position, at which the panel member 21 is substantially vertically arranged, by an operation of the roof opening/closing apparatus 20 so as not to interfere with extending and retracting movements of the roof 10.

In a state where the roof 10 is located in the accommodated position and the vehicle compartment 18 is opened as illustrated in FIG. 2C (i.e., the open-air mode of the vehicle 1), the panel member 21 is returned to the horizontal position. However, when the roof 10 is located in the accommodated position, the rear roof 13, which is located between a front end of the cover 16 and the rear end of the panel member 21, is moved. Therefore, a space is generated at an upper portion of the accommodating space 19. As will be described below in detail, the panel member 21 is extended in the longitudinal direction of the vehicle 1 by an operation of the roof opening/closing apparatus 20, thereby covering the space generated at the upper portion of the accommodating space 19 with the panel member 21 to close the accommodating space 19.

Next, with reference to FIGS. 3 to 7, a structure of the roof opening/closing apparatus 20 will be described hereinafter.

The roof opening/closing apparatus 20 is provided inside the accommodating space 19 and divides the vehicle compartment 18 and the accommodating space 19. Further, the roof opening/closing apparatus 20 includes a panel moving mechanism 40. According to the embodiment, the roof opening/closing apparatus 20 includes right and left panel moving mechanisms 40 (serving as first and second panel moving mechanisms), which are assembled at the vehicle body portion 91 supporting the seatback portion 15 of the back seat. In FIG. 3, a right side portion of the vehicle 1 (including the right panel moving mechanism 40) is illustrated as an example, however, the left panel moving mechanism 40 is also provided at the left side of the vehicle 1. Thus, the right and left panel moving mechanisms 40 support the panel member 21 from a lower side of the panel member 21. Hereinafter, a structure of the right panel moving mechanism 40 will be described as an example of the right and left panel moving mechanisms 40.

As described above, the panel member 21 is in the horizontal position when the roof 10 is located in the accommodated position. The panel member 21 is structured with a front panel (serving as a first panel) and a rear panel (serving as a second panel), which are aligned in the longitudinal direction of the vehicle when the roof 10. Further, the panel moving mechanism 40 includes a driving apparatus 44 serving as a driving source for moving the panel member 21 and adjusting a position thereof.

The right and left panel moving mechanisms 40 are connected by connecting members 47a and 47b (each serving as a connecting member). Therefore, the driving apparatus 44 may be provided at one of or both of the right and left driving apparatus 44 on the basis of a size and weight of the panel member 21, which may be changed in accordance with a vehicle. The right and left panel moving mechanisms 40 are synchronously operated in cooperation with each other by the connecting members 47a and 47b when moving the panel member 21. Thus, torsion is prevented from being generated at the panel member 21 and also, an excessive load is prevented from being applied to the panel member 21 which extends in the width direction of the vehicle 1.

Figure 4:
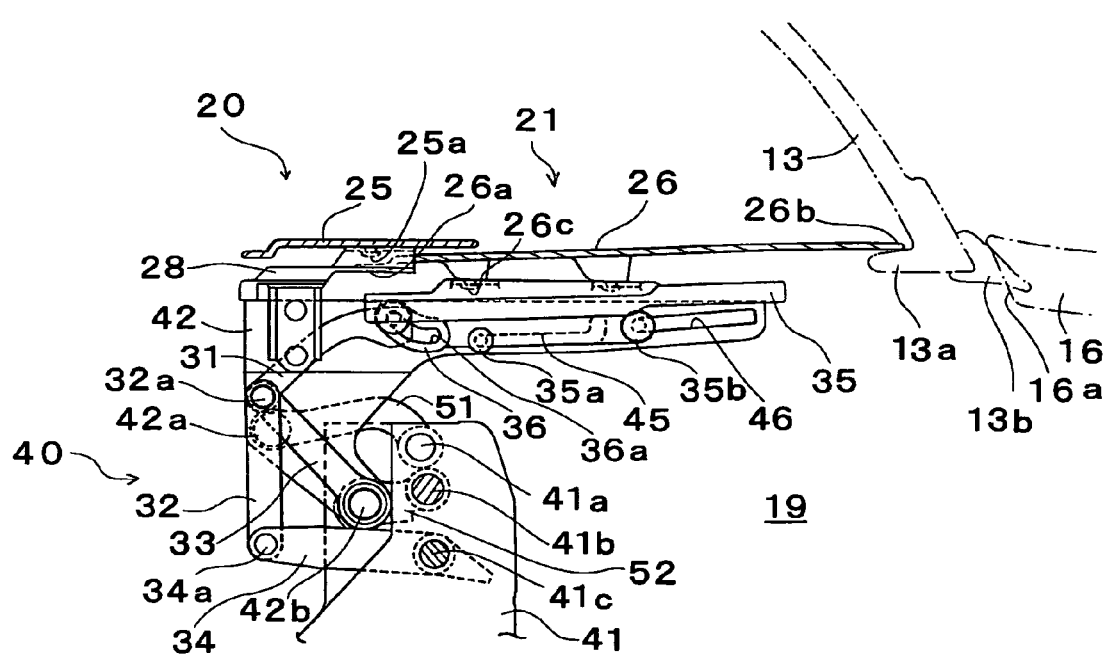
FIG. 4 is a side view illustrating a panel moving mechanism and a panel member of the roof opening/closing apparatus when the roof is in the extended position, according to the embodiment.
Figure 5:
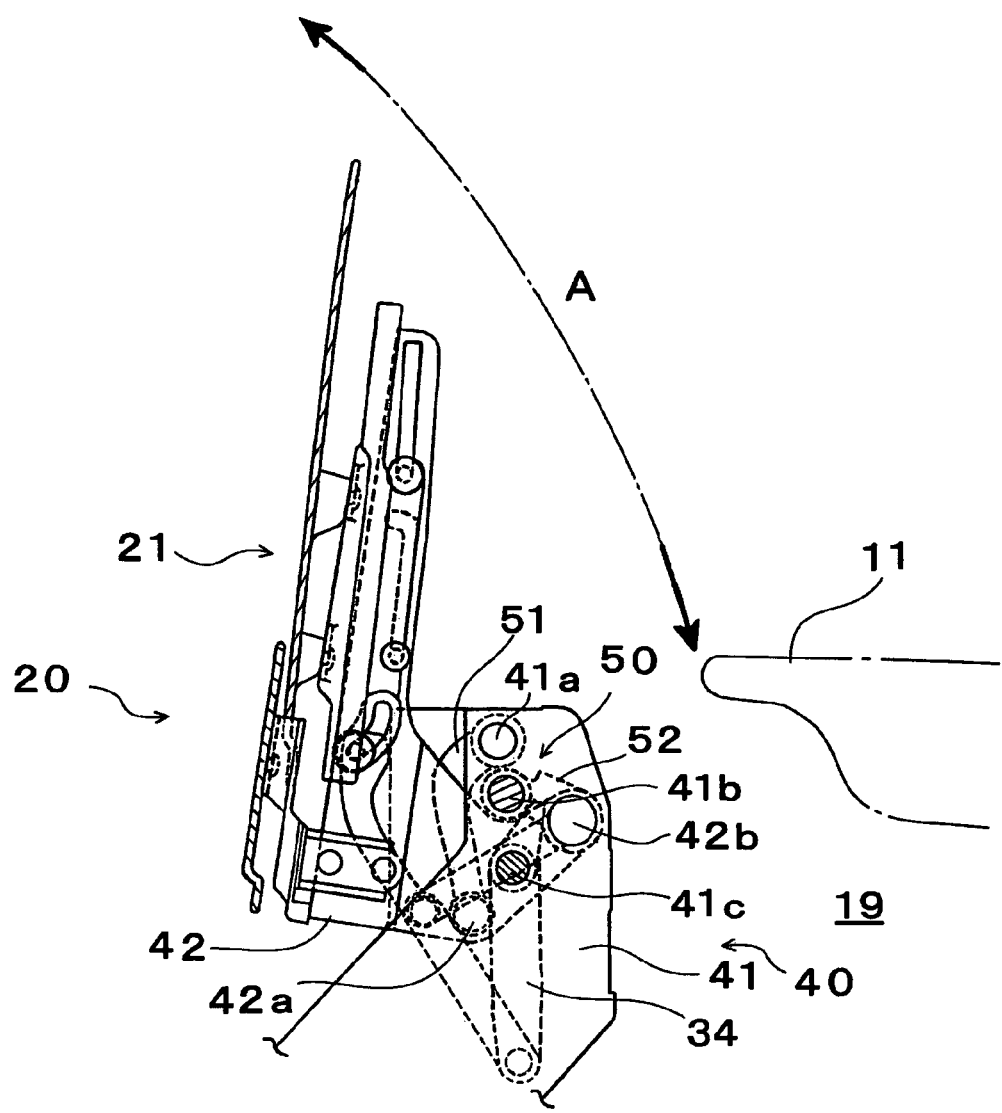
FIG. 5 is a side view illustrating the panel moving mechanism and the panel member of the roof opening/closing apparatus when the roof is moved towards the accommodated position, according to the embodiment.
Figure 6:
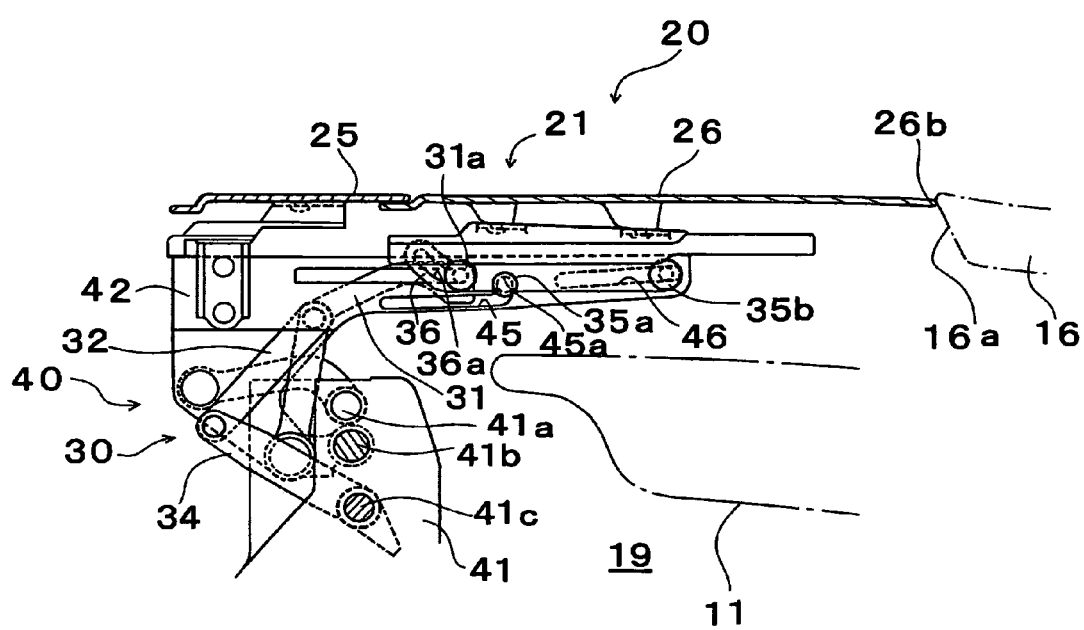
FIG. 6 is a cross sectional view, illustrating the panel moving mechanism and the panel member of the roof opening/closing apparatus when the roof is in the accommodated position, taken along line VI-VI in FIG. 3.

In FIGS. 4 and 6, a mechanism of the panel moving mechanism 40 and the panel member 21, when the roof 10 is located in the accommodated position, is illustrated. In FIG. 5, the mechanism of the panel moving mechanism 40 and the panel member 21, when the roof 10 is moved towards the accommodated position, is illustrated.

As illustrated in FIG. 4, the panel moving mechanism 40 includes a base bracket 41, which is fixed at the vehicle body portion 91 (see FIG. 3). The base bracket 41 supports pivot shafts 41a, 41b and 41c, each of which extends in the width direction of the vehicle 1. The pivot shaft 41a is located at the uppermost position, and the pivot shaft 41c is located at the lowermost position of the three pivot shafts 41a, 41b and 41c. The pivot shaft 41b is positioned between the pivot shafts 41a and 41c. The panel moving mechanism 40 further includes a supporting bracket 42. The supporting bracket 42 extends horizontally in the width direction of the vehicle and includes pivot shafts 42a and 42b. The pivot shafts 42a and 42b are provided at the supporting bracket 42 with a predetermined distance therebetween.

The pivot shaft 41a of the base bracket 41 and the pivot shaft 42a of the supporting bracket 31 are connected by a first link 51. The pivot shaft 41b of the base bracket 41 and the pivot shaft 42b of the supporting bracket 42 are connected by a second link 52. The base bracket 41, the supporting bracket 42, the first link 51 and the second link 52, each of which includes different length from one another, structure a four-link mechanism. More specifically, the base bracket 41, the supporting bracket 42 and the first and second links 51, 52 structure a pivotal moving mechanism 50 (see FIG. 5). The pivotal moving mechanism 50 establishes a predetermined attitude of the supporting bracket 42, in which the supporting bracket 42 is rotated relative to the base bracket 41 in accordance with a rotational angle of the first and second links 51 and 52.

A first elongated groove hole 45 and a second elongated groove hole 46 are formed at the supporting bracket 42 with a predetermined distance from each other. The first and second elongated groove holes 45 and 46 extend in the longitudinal direction of the vehicle. A sliding bracket 35 is supported by the supporting bracket 42. The sliding bracket 35 includes a first pin 35a, which is inserted into the first elongated groove hole 45 and guided thereby, and a second pin 35b, which is inserted into the second elongated groove hole 46 and guided thereby. A cam member 36 including a cam hole 36a is fixedly attached to the sliding bracket 35. A pin 31a is inserted into the cam hole 36a so as to be guided thereby. Further, the pin 31a is connected to an upper end portion of a third link 31. An upper end portion of a fourth link 32 and an upper end portion of a fifth link 33 are rotatably connected to a lower end portion of the third link 31 by means of a common pivot shaft 32a.

A lower end portion of the fifth link 33 is rotatably connected to the supporting bracket 42 by means of the pivot shaft 42b, which is commonly used for the second link 52. Further, a lower end portion of the fourth link 32 is rotatably connected with one end of a sixth link 34 by means of a pivot shaft 34a. Further, another end portion of the sixth link 34 is rotatably supported by the base bracket 41 by means of a pivot shaft 41c. The sliding bracket 35 is operatively connected to the sixth link 34 and guided thereby via the third to fifth links 31, 32 and 33, and the sliding bracket 35 is moved in the longitudinal direction of the vehicle 1 relative to the supporting bracket 42 by a rotation of the sixth link 34. The sliding bracket 35 structure a sliding mechanism 30 for slidably moving the second panel 26 relative to the first panel 25.

An assembling bracket 28 is fixedly assembled at a front upper portion of the supporting bracket 42. The front panel 25 is fixedly assembled to (locked to) the assembling bracket 28 by means of a locking portion 25a. The locking portion 25a protrudes from the front panel 25 so as to be inserted into a hole defined at the assembling bracket 28. The front panel 25 is structured to be easily detached from the assembling bracket 28 of the supporting bracket 42 by means of the locking portion 25a. Further, the rear panel 26 is fixedly assembled to (locked to) an upper portion of the sliding bracket 35 by means of a locking portion 26c. The rear panel 26 is structured to be easily detached from the sliding bracket 35 by means of the locking portion 26c.

A rear end portion 26b of the rear panel 26 is in contact with a supporting portion 13a which is formed at a lower end portion of the rear roof 13. A front end portion 26a of the rear panel 26 is positioned beneath the front panel 25, so that the front panel 25 and the rear panel 26 are overlapped by a predetermined range. A front end portion 16a of the cover 16 is in contact with a sealing member 13b assembled at the supporting position 13a of the rear roof 13, so that a space between the cover 16 and the rear roof 13 is closed. Accordingly, the accommodating space 19 is covered with the first panel 25, the rear panel 25, the supporting position 13a and the cover 16, thereby being tightly closed.

As illustrated in FIG. 5, a rear end of the panel member 21 is upwardly pivotally moved in association with the supporting bracket 42 by the operation of the pivotal moving mechanism 50, thereby opening the accommodating space 19. More specifically, the pivot shaft 41b of the link 52 rotates in the counterclockwise direction in FIG. 5 by a driving force of the driving apparatus 44, which is transmitted via the driving force transmitting mechanism 60 (described below in detail), thereby moving the panel member 21 to be in the upright position. When an end portion of the front roof 11 is moved between the accommodated position and the extended position along a locus A (see FIG. 5), the panel member 21 is moved to the upright position so as to be away from the locus A of the front roof 11. Thus, the panel member 21 is structured so as not to interfere with the movement of the roof 10 moved between the accommodated position and the extended position.

As illustrated in FIG. 6, the pivot shaft 41c connected to the sixth link 34 rotates in the clockwise direction by the driving force of the driving apparatus 44, which is transmitted via the driving force transmitting mechanism 60. Then, the sliding mechanism 30 is operated, so that the sliding bracket 35 is moved further backwardly than a position indicated in FIG. 4 by being guided by the first and second elongated groove holes 45, 46 of the supporting bracket 42. Then, the rear end portion 26a of the rear panel 26 is moved in association with the sliding bracket 35 to a position at which the rear end portion 26a directly makes contact with the front end portion 16a of the cover 16 so as to close the space generated between the cover 16 and the supporting position 13a of the rear roof 13 when the rear roof 13 is retracted. Thus, the accommodating space 19 is closed even when the roof 10 is moved to the accommodated position.

The first elongated groove hole 45 includes a bent groove portion 45a, which is formed at a rear end portion of the first elongated groove hole 45 by upwardly bending the same. When the pin 31a is operated to upwardly move the cam member 36, the pin 35a is fitted into the vent groove portion 45a of the first elongated groove hole 45. Accordingly, the front end portion 26a of the rear panel 26 is upwardly moved. The rear end portion 26a of the rear panel 26 is in contact with a lower surface of the front panel 25, and upper surfaces of the rear panel 26 and the front panel 25 structure a successive plane surface. Therefore, an excellent appearance of the convertible automobile is established.

Hereinafter, a structure of the driving force transmitting mechanism 60 will be described with reference to FIGS. 7A, 7B and 7C.

The driving force transmitting mechanism 60 includes a driving gear 61, a gear 62 for the sliding mechanism 30 and a gear 63 for the pivotal moving mechanism 50. The diving gear 61 rotates by a driving force of an electric motor incorporated in a driving apparatus 44. A shaft 62c of the gear 62 for the sliding mechanism 30 is connected with the pivot shaft 41c to rotate the sixth link 34 (see FIG. 4). A shaft 63c of the gear 63 for the pivotal moving mechanism 50 is connected with the pivot shaft 41b to rotate the second link 52 (see FIG. 4). The gears 62 and 63 are intermittent gears, which respectively include teeth portions at a predetermined angular range and which do not rotate by 360-degrees, and are employed for pivotally moving (rotating) the sixth link 34 and the second link 52, respectively.

Figure 7A:
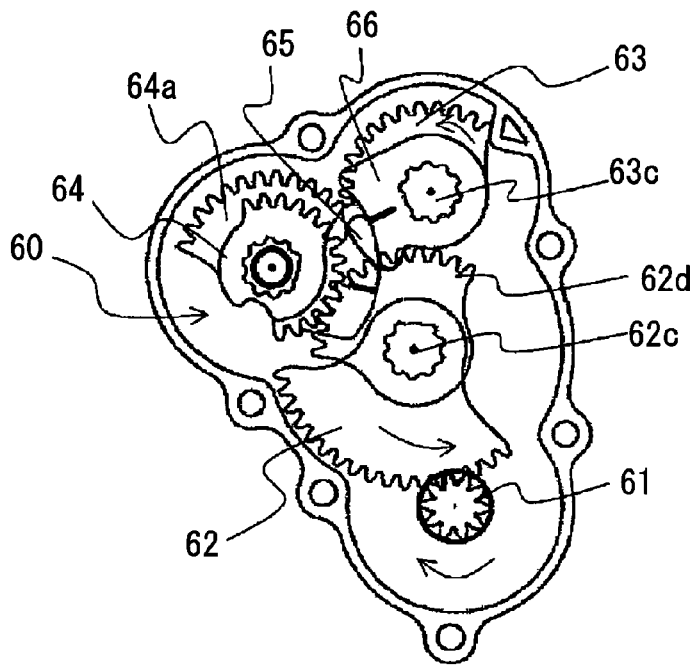
FIG. 7A is a schematic view illustrating a driving force transmitting mechanism of the roof opening/closing apparatus when the roof is in the extended position.
Figure 7B:
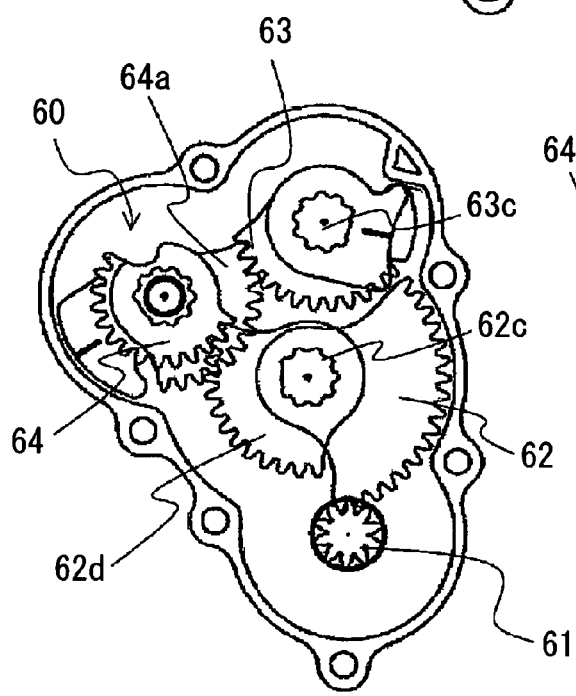
FIG. 7B is a schematic view illustrating the driving force transmitting mechanism of the roof opening/closing apparatus when the panel is in an upright state while the roof is moved towards the accommodated position.
Figure 7C:
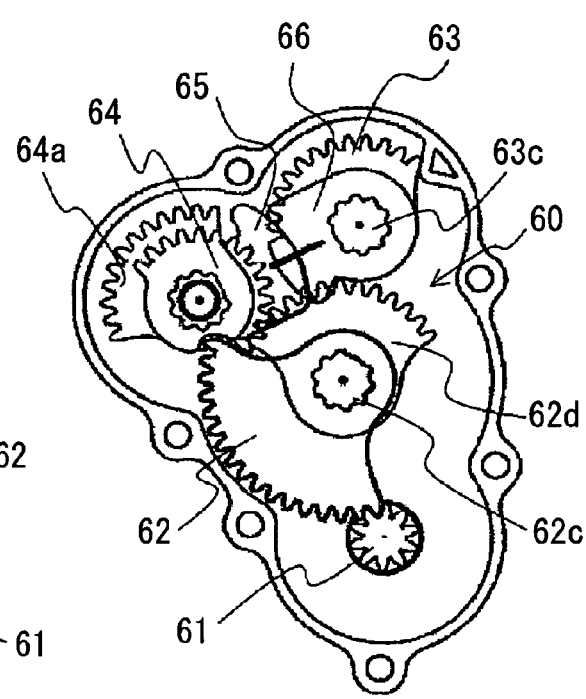
FIG. 7C is a schematic view illustrating the driving force transmitting mechanism of the roof opening/closing apparatus when the roof is in the accommodated position.

As illustrated in FIG. 7A, when the panel moving mechanism 40 is in a state illustrated in FIG. 4, i.e., when the roof is located in the extended position as illustrated in FIG. 2A, the driving gear 61 is engaged with the gear 62. An arc shaped driven gear 62*d* is integrally provided at the gear 62 so as to rotate therewith. An intermediate gear 64 is engaged with the driven gear 62*d* of the gear 62. The intermediate gear 64 also includes a teeth portion at a predetermined angular range and does not rotate by 360-degrees. An arc-shaped driven gear 64*a* is integrally provided at the intermediate gear 64 so as to rotate therewith. The gear 63 is engaged with the driven gear 64*a* of the intermediate gear 64.

When moving the roof 10 to the accommodated position as indicated in FIG. 2B, the driving gear 61 rotates in the clockwise direction as illustrated in FIG. 7A so as to move the panel member 21 to the upright position. Then, the gear 62 engaged with the driving gear 61 and the driven gear 62*d* of the gear 62 rotates in the counterclockwise direction. Further, the intermediate gear 64 and the driven gear 64*a* thereof, which are engaged with the driven gear 62*d* of the gear 62, rotate in the clockwise direction. Still further, the gear 63 for the pivotal moving mechanism 50 is rotated by being engaged with the driven gear 64*a* of the intermediate gear 64. Then, the transmitting mechanism 60 is in a state as illustrated in FIG. 7B. Consequently, the second link 52 (see FIG. 5) rotates in the counterclockwise direction, and the panel member 21 is moved to the upright position by the operation of the pivotal moving mechanism 50.

Next, when the roof 10 is located in the accommodated position as illustrated in FIG. 2C, the driving gear 61 rotates in the counterclockwise direction so as to backwardly pivotally (rotationally) move the rear panel 26. Then, the gear 62 engaged with the driving gear 61 and the driven gear 62*d* rotate in the clockwise direction. Further, the intermediate gear 64 and the driven gear 64*a* thereof, which are engaged with the driven gear 62*d*, rotate in the counterclockwise direction, so that the gear 63 engaged with the driven gear 64*a* rotates in the clockwise direction. Thus, the panel member 21 is tilted towards the horizontal position. Then, the driving force transmitting mechanism 60 is in the state as illustrated in FIG. 7A. At this time, an engagement between the teeth portion of the driven gear 64*a* of the intermediate gear 64 and the teeth portion of the gear 63 is released, so that the pivotal moving mechanism 50 is not actuated. After that, the driving gear 61 further rotates in the counterclockwise direction and drives the gear 62 engaged with the driving gear 61 to rotate in the clockwise direction. Therefore, the sliding mechanism 30 is actuated, thereby slidably moving the rear panel 26 of the panel member 21 in the rear direction of the vehicle. As described above, in the state illustrated in FIG. 7A, although the intermediate gear 64 rotates by being engaged with the driven gear 62 of the gear 62, the engagement between the teeth portions of the driven gear 64*a* and the gear 63 is released, so that the rotation of the gear 63 is restrained. In order to restrain the rotation of the gear 63, an engagement member 65 and an engagement member 66 are engaged with each other. The engagement member 65 includes an arc-shaped protruding surface (convex surface) and is integrally provided at the intermediate gear 64 so as to rotate therewith. On the other hand, the engagement member 66 includes an arc-shaped recessed surface (concave surface) and is integrally provided at the gear 63 so as to rotate therewith. By an engagement between the protruding surface of the engagement member 65 and the recessed surface of the engagement member 66, the rotation of the gear 63 is restrained. Herein, the driving force transmitting mechanism 60 is in a state as illustrated in FIG. 7C. Thus, the gear 62 and the gear 63 structure an intermittent motion gear mechanism, through which the sliding mechanism 30 and the pivotal moving mechanism 50 are intermittently actuated by the common driving apparatus 44.

As described above, the roof opening/closing apparatus 20 and the retracting and extending operations of the roof 10 which are performed by the first and second supporting mechanisms 71 and 72 are controlled on the basis of a controlling program stored in a roof controlling apparatus included in the vehicle 1.

Due to the structure described above, the panel member 21 is easily detachable from the panel moving mechanism 40. Further, a moving range of the front panel 25 and the rear panel 26 is changed by a controlling program stored in a controlling apparatus of the panel moving mechanism 40 and is converted to a movement of the panel member 21. So configured, even when the panel member 21 is changed to another panel member of which shape is different from the panel member 21, a structure of the panel member is rarely changed. Accordingly, the structure of the panel member 21 is applied to various types of vehicles at a lower cost.

According to the embodiment, the panel member 21 is structured with the front panel 25 (serving as the first panel) and the rear panel 26 (serving as the second panel), which are longitudinally aligned. However, another panel (serving as a third panel) may be provided at a rear side of the rear panel 26. Thus, the panel member 21 may be structured with plural panels.

Due to the above described structure, the sliding mechanism 30 slidably moves the rear panel 26 relative to the front panel 25 for adjusting a length of the panel member 21 in the longitudinal direction of the vehicle 1. More specifically, by the operation of the sliding mechanism 30, the front and rear panels 25, 26 are overlapped when the roof 10 is located in the extended position, thereby reducing the length of the panel member 21 in the longitudinal direction of the vehicle to be smaller than the length of the panel member 21 when the roof is located in the accommodated position. Thus, because of the sliding mechanism 30, the panel moving mechanism 40 is provided under the panel member 21 to support the panel member 21 from the lower side thereof. Accordingly, even though the weight of the panel member is reduced, the strength and rigidity of the panel member 21 is ensured.

Further according to the embodiment, the panel moving mechanism 40 is provided inside the accommodating space 19 positioned under the panel member 21. Further, the panel moving mechanism 40 includes the pivotal moving mechanism 50 for pivotally moving the panel member 21 when the roof 10 is moved between the extended position and the accommodated position.

Due to the above described structure, the sliding mechanism 30 and the pivotal moving mechanism 50 are included in the unit of the panel moving mechanism 40. Therefore, the roof opening/closing apparatus 20 is downsized.

Still further according to the embodiment, the panel moving mechanism 40 includes the driving force transmitting portion 60 having the intermittent motion gear mechanism through which the sliding mechanism 30 and the pivotal moving mechanism 50 are intermittently actuated by the common driving apparatus 44.

Due to the above described structure, because of the force transmitting mechanism 60 including the intermittent motion gear mechanism, the sliding mechanism 30 and the pivotal moving mechanism 50 are actuated with the same (common)

driving apparatus 40. Therefore, the number of components is reduced, so that the roof opening/closing apparatus 20 is produced at low cost.

Still further, the panel moving mechanism 40 includes the right and left (first and second) panel moving mechanisms 40, which are provided under the panel member 21 with a predetermined distance from each other. Further, the connecting member 47a/47b connects the right and left panel moving mechanisms 40 for operating the right and left panel moving mechanisms 40 to move in association with each other.

Due to the above described structure, the panel member 21 is supported by the right and left panel moving mechanisms 40. Thus, the strength of the panel member 21 is enhanced. In addition, due to such structure, the excessive load is prevented from being applied to the panel member 21. Also, the panel member 21 is surely moved to a predetermined position.

Still further, the locking portion 25a/26c detachably locks the panel member 21 to the panel moving mechanism.

Due to the above described structure, because the panel member 21 is detachable to the panel moving mechanism 40, the moving range between the front panel 25 and the rear panel 26 is changed by the change of the controlling program of the controlling apparatus of the panel moving mechanism 40. So configured, even when the panel member 21 is changed to another panel member of which shape is different from the panel member 21, the structure of the panel member 21 is applied to various types of vehicles at the lower cost without changing the expensive panel moving mechanism 40.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. An apparatus for moving a roof of a vehicle between first and second positions at which the roof is extended to cover a compartment of the vehicle and is accommodated in an accommodating space of the vehicle, respectively, the apparatus comprising:

a panel member for covering an upper portion of the accommodating space, the panel member including a first panel and a second panel aligned in a longitudinal direction of the vehicle, the second panel provided at a rear side of the first panel; and a panel moving mechanism provided under the panel member and movably supporting the first panel and the second panel, wherein the panel moving mechanism includes a sliding mechanism slidably moving the second panel relative to the first panel so that the first and second panels are overlapped when the roof is located in the first position and a length of the panel member in the longitudinal direction of the vehicle is reduced to be smaller than the length of the panel member when the roof is located in the second position;

the panel moving mechanism is provided inside the accommodating space positioned under the panel member;

the panel moving mechanism includes a pivotal moving mechanism for pivotally moving the panel member when the roof is moved between the first position and the second position; and the panel moving mechanism includes a driving force transmitting portion having an intermittent motion gear mechanism through which the sliding mechanism and the pivotal moving mechanism are intermittently actuated by a common driving apparatus.

2. The apparatus according to claim 1, wherein the panel moving mechanism includes a first panel moving mechanism and a second panel moving mechanism provided under the panel member with a predetermined distance from each other, and a connecting member connects the first and second panel moving mechanisms for operating the first and second panel moving mechanisms to move in association with each other.

3. The apparatus according to claim 1, further comprising:

a locking portion detachably locking the panel member to the panel moving mechanism.

4. The apparatus according to claim 1, wherein the pivotal movement of the panel member terminates in an upward direction.

* * * * *